June 5, 1923. 1,458,074
A. PIKOOS
TOOTHBRUSH
Filed March 22, 1922
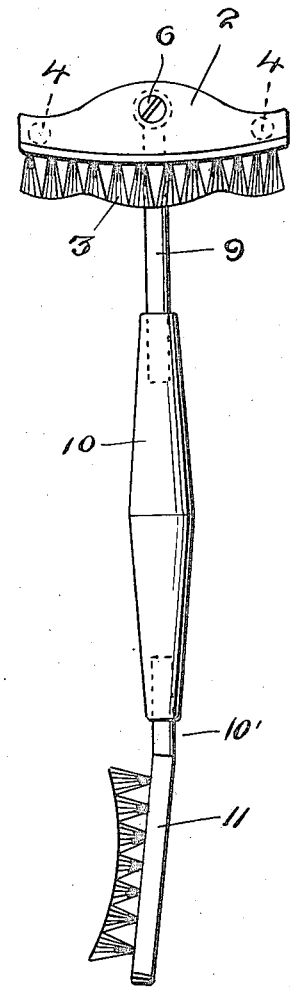
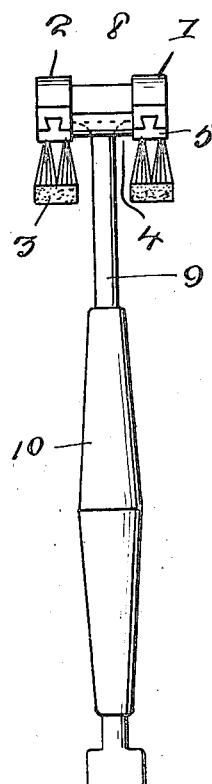
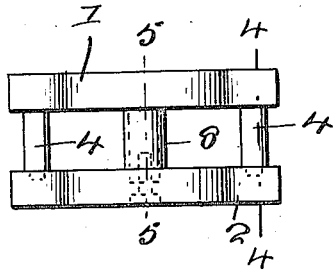
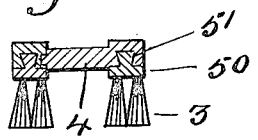
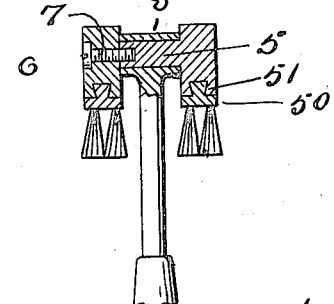
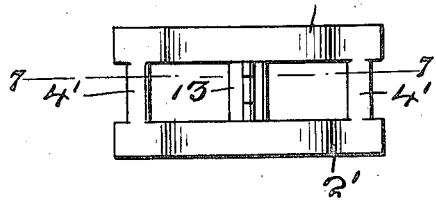
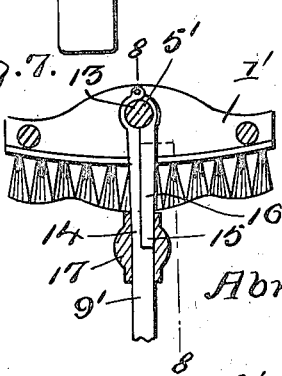
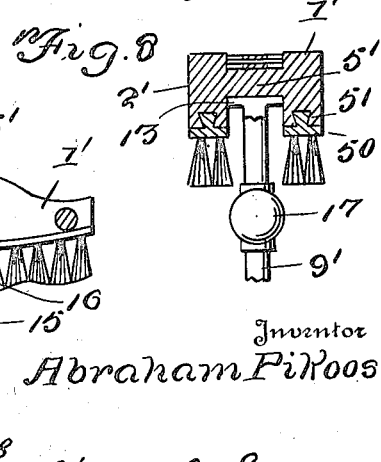
Inventor
Abraham Pikoos
By Victor J. Evans
Attorney Patented June 5, 1923.

1,458,074

UNITED STATES PATENT OFFICE.

ABRAHAM PIKOOS, OF BALTIMORE, MARYLAND.

TOOTHBRUSH.

Application filed March 22, 1922. Serial No. 545,810.

*To all whom it may concern:*

Be it known that I, ABRAHAM PIKOOS, a citizen of the United States, residing at Baltimore, in the county of Baltimore City and State of Maryland, have invented new and useful Improvements in Toothbrushes, of which the following is a specification.

My present invention has reference to improvements in tooth brushes.

My primary object is to produce a tooth brush by the use of which the inner surfaces of the upper and lower rows of teeth can be simultaneously cleaned in an easy, expeditious and effective manner.

A further object is to produce a tooth brush that shall comprise spaced parallel heads each having bristles and a swingable handle pivotally secured between the heads, the said bristles designed to engage with the inner surfaces of the upper and lower rows of teeth, while means is provided for limiting the swinging of the handle to prevent the same contacting with and inflicting injury to the user.

A still further object is to produce a tooth brush which comprises spaced heads arranged in parallelism having connecting means therebetween which hold the said ends in proper relation with each other, each of said heads carrying bristles, while removably and pivotally secured to the central connecting means for the head there is a short handle or shank, the remaining connecting elements providing stops for limiting the swinging of the said short handle or shank, said short handle or shank being removably connected to a main handle, the latter having also removably secured to its outer end the short shank or handle portion of an ordinary tooth brush, the construction being such that the inner surfaces of the upper and lower rows of teeth may be simultaneously cleaned by the first mentioned brushes, the last mentioned brush acting upon the outer surfaces of the teeth for cleaning the same.

A still further object is to produce a tooth brush that includes a double headed member in the nature of a frame, each of said heads being provided with bristles, and the connecting means between the heads spacing the latter, and in which the spacing means may be integrally formed upon one of the heads and interengaging with the second head, removable means passing through the last mentioned head and entering one of the spacing means for effectively connecting the heads, the central spacing element having removably and pivotally associated therewith a short handle or shank which is removably connected to a main handle, the said main handle also carrying a removable tooth brush of the ordinary construction.

A still further object is to produce a device of this character which shall be of a comparatively simple construction, cheaply manufactured and marketed, and thoroughly efficient for the purpose set forth.

The drawing which accompanies and which forms part of this specification illustrates satisfactory embodiments of the improvement reduced to practice, and wherein:—

Figure 1 is side view of a tooth brush in accordance with this invention.

Figure 2 is a view taken at right angles to Figure 1.

Figure 3 is a plan view thereof looking toward the parallel bristle carrying heads.

Figure 4 is a sectional view on the line 4—4 of Figure 3.

Figure 5 is a sectional view on the line 5—5 of Figure 3.

Figure 6 is a plan view of a double headed tooth brush in accordance with the invention but illustrating a modification.

Figure 7 is a sectional view on the line 7—7 of Figure 6.

Figure 8 is a view taken approximately on line 8—8 of Figure 7.

In both forms of my improvement. I make use of two parallel members 1 and 2 respectively. These members preferably have their ends rounded and their inner faces arranged at a slight curvature. On these inner faces there are bristles 3. By reference to the drawing, it will be noted that the bristles have their outer edges cut or shaped to provide central portions which are rounded and end portions which are likewise rounded. By such arrangement, I have found that the bristles will more effectively contact with the inner surfaces of the teeth and enter the spaces between the teeth.

The heads 1 and 2 are held in spaced relation to each other by spacer elements. In one form of the improvement, the spacer elements 4—4 and 5 respectively are integrally formed on the inner face of the head 1. The spacer elements 4 are disposed adjacent to the ends of the head 1, the spacer element 5 being formed at the center of the said head. Preferably, all of the spacer elements are round in cross section which is essentially true with respect to the spacer element 5. The spacer members 4—4 and 5 are received in suitable depressions or sockets in the inner face of the head 2. The head 2 is centrally provided with an opening, the outer face of the head being reamed around the opening for the reception of the head 6 of a short bolt 7, the said bolt entering an interiorly threaded socket in the spacer member 5.

The spacer member 5 provides a shaft or trunnion for a sleeve 8 on one end of a short handle or shank 9. The outer end of the short handle 9 is threaded and is received in a threaded socket in either end of a main handle 10. The main handle is preferably increased in thickness from its center to its ends, and screwed in the second socket of the main handle 10 is the threaded end of a short shank or handle 10′ on the head 11 of a tooth brush of the ordinary construction.

In the construction wherein the spacer members 4′—4′ and 5′ are integrally formed with the heads 1′ and 2′, the sleeve on the short handle or shank which engages the central spacer member 5′ is in the nature of a split ring. One section 13 of the sleeve is formed on the reduced extension 14 of the short handle or shank 9′. The outer face of the extension 14 is flat and is in contacting engagement with the flat inner face of a member 15 which carries the second section 16 of the sleeve. The members 14, 15 and 9′ are round in plan, and the members 14 and 15 are gradually widened to their connection with the sleeve sections 13 and 16. Arranged for slidable movement over the members 14 and 15 and on the short handle or shank 9′ there is a spring sleeve 17. The sleeve is really in the nature of a clamping member and when brought outwardly against the sleeve sections, the member 15 will be effectively secured on the extension 14 of the short handle or shank 9′, and the sleeve pivotally secured on the spacer element 5′.

It is believed that the construction and operation of the improvement will be apparent. The heads 1 and 2 are arranged so that their bristles 3 will engage with the inner surfaces of the upper and lower rows of teeth. The brushes 2 and 3 are moved over the teeth in the usual manner by the manipulation of the handle 10. The handles 9 or 9′ are in the path of contact with the outer spacer elements 4 or 4′ of the frame which includes the spaced heads so that swinging of the handle will be thus limited and as a consequence the shank or short handle cannot be brought violently in contact with the ends of the mouth of the user. The frames constituting the heads may be cheaply manufactured. In the construction wherein the heads are separably connected, either of the same may be replaced when the bristles of the same are worn. When not in use, the heads may be swung against the short handles or shanks which are pivoted thereto so that the brush can be conveniently stored when not in use. In addition to this, the brush 11 may be readily separated from the main handle 10 and the said main handle may be readily removed from the short handle or shank 9 or 9′, so that the device may be arranged in a small package for shipment.

As disclosed by the drawings, the brushes are removably associated with the heads. To accomplish this, the heads are channeled longitudinally, and the parallel walls provided thereby may be either beveled or formed at their edges with inwardly directed ribs. The backs of the brushes have cross sectionally beveled ribs to be received in the wedge-shaped grooves, as indicated by the numeral 50, or the said backs may have their sides grooved to receive the ribs 51 in the channeled heads.

Having described the invention, I claim:—

In a tooth brush, parallel heads each having bristles, a central and end spacing element integrally formed on one of the heads and interengaging the other head, means on the last mentioned head engaging one of said spacing elements for connecting the heads, and a short handle pivoted on the central spacing element and in the path of contact with the end spacing elements.

In testimony whereof I affix my signature.

ABRAHAM PIKOOS.